Figure 1:
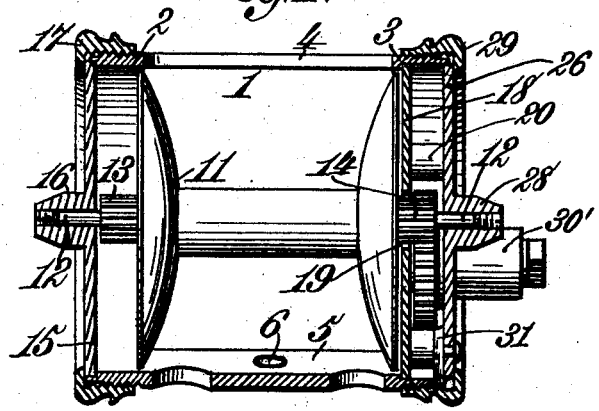

No. 765,554. PATENTED JULY 19, 1904.
W. CARTER.
FISHING REEL.
APPLICATION FILED AUG. 28, 1903.
NO MODEL.

Witnesses
Robert Everitt
Dennis Sumby

Inventor
William Carter
By James L. Norris
Atty

No. 765,554. Patented July 19, 1904.

UNITED STATES PATENT OFFICE.

WILLIAM CARTER, OF LOUISVILLE, KENTUCKY.

FISHING-REEL.

SPECIFICATION forming part of Letters Patent No. 765,554, dated July 19, 1904.

Application filed August 28, 1903. Serial No. 171,140. (No model.)

*To all whom it may concern:*

Be it known that I, WILLIAM CARTER, a citizen of the United States, residing at Louisville, in the county of Jefferson and State of Kentucky, have invented new and useful Improvements in Fishing-Reels, of which the following is a specification.

This invention relates to certain new and useful improvements in fishing-reels, and aims particularly to provide a fishing-reel which can be readily taken apart and assembled when occasion requires.

The invention further aims to provide a fishing-reel with a removable inner head-plate carrying the bearing for the multiplying-gear and to further provide the reel with a pair of removable outer head-plates carrying the bearings for the axis of the spool.

The invention further aims to provide the inner head-plate with a suitable spacing means which engage in one of the outer head-plates for connecting the inner and outer head-plates together and for retaining the inner and outer head-plates a suitable distance apart when in their normal position, thereby preventing the movement of the multiplying-gear being retarded in any manner.

The invention further aims to provide a bearing-spindle for the multiplying-gear having one portion thereof constructed in an eccentric manner with respect to the other portion thereof, and by such arrangement when the spindle is secured in the inner head-plate it can be positioned in such a manner that the multiplying-gear will be brought into proper mesh with the pinion carried on the axis of the spool.

The invention further aims to construct a fishing-reel which shall be extremely simple in its construction, readily taken apart and assembled, efficient in its use, strong, durable, and comparatively inexpensive to manufacture.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 2:
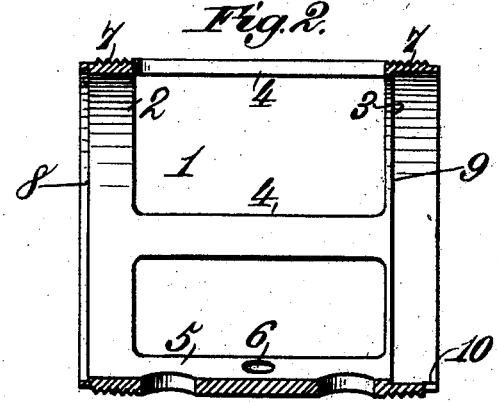
Figure 3:
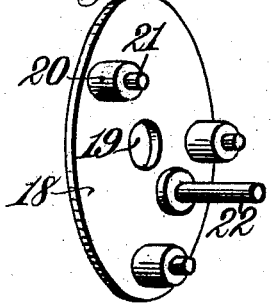
Figure 4:
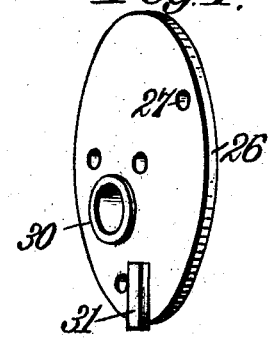
Figure 5:
Figure 6:
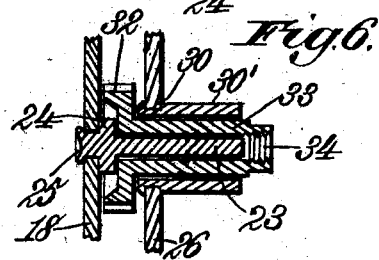
Figure 7:
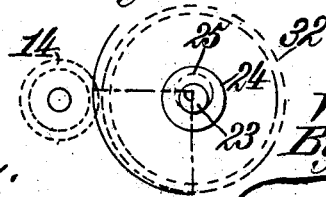

Figure 1 is a sectional elevation of the fishing-reel. Fig. 2 is a sectional detail of the frame. Fig. 3 is a detail showing the inner head-plate. Fig. 4 is a detail showing the outer head-plate, which is adapted to be connected to the inner head-plate. Fig. 5 is a detail showing the bearing-spindle. Fig. 6 is a longitudinal sectional view of the multiplying-gear and the bearing-spindle; and Fig. 7 is a diagrammatical view of the multiplying-gear, bearing-spindle therefor, and pinion on the spool-axis, showing by the adjustment of the spindle how the multiplying-gear is brought into proper mesh with the pinion on the spool-axis.

Referring to the drawings by reference-numerals, 1 denotes the reel-frame, which is constructed of a short tube of suitable material and cut away to form a pair of end bands 2 3, a plurality of connecting-bars 4, and a connecting-bar 5 of greater width than the bars 4. The bars 4 and 5 connect the bands 2 3 together, and the bar 5 is provided with a plurality of openings 6 to receive a suitable fastening means for connecting the reel-seat (not shown) to the frame 1. Each of the end bands 2 3 is provided with exterior screw-threads 7, and the inner faces of the bands 2 3 are suitably bored away to form the seats or shoulders 8 9, respectively, for the inner and one of the outer head-plates to rest against or seat against. The head-plates will be hereinafter referred to. The seat or shoulder 8 of the band 2 is formed at a point slightly removed from the outer edge of the band 2, and the seat or shoulder 9 of the band 3 is formed at a point slightly removed from the inner edge of the band 3. The latter is also provided with a notch 10, arranged in the outer edge thereof, for a purpose to be hereinafter referred to.

The reference character 11 denotes the spool, and the reference character 12 the axis of the spool. The axis 12 of the spool 11 projects from each end thereof and is provided with pinions 13 14, the former of which is for the click mechanism and the latter of which is adapted to be engaged by the multiplying-gear to be hereinafter referred to.

Extending in the band 2 and seated against the shoulder 8 is an outer head-plate 15, which carries the click mechanism, if it is desired to use one, (the click mechanism not shown,) and the head-plate 15 is provided with a central opening through which extends one of the projecting ends of the axis 12. The walls of the central opening in connection with a bearing-thimble 16, which registers with said opening, forms the bearing for one of the projecting ends of the axis 12. The bearing-thimble 16 is secured in any suitable manner to the outer face of the plate 15. The thickness of the head-plate 15 is such that it will project slightly away from the edge of the band 2, and the head-plate 15 is secured to the frame 1 by means of an interiorly-screw-threaded flange-collar 17, which engages the screw-threads 7 of the band 2. When the collar 17 is screwed home, the flange thereof is adapted to engage the outer face of the plate 15 and securely retain the plate 15 in position at one end of the reel-frame 1.

Mounted within the band 3 and bearing or seated against the shoulder 9 is an inner head-plate 18, having a centrally-arranged opening 19, through which extends the pinion 14, carried on the other projecting end of the axis 12. The diameter of the opening 19 is slightly greater than the diameter of the pinion 14, so that the pinion 14 will not engage the wall of said opening 19.

Riveted or otherwise secured to one face of the inner head-plate 18 is a plurality of shouldered fastening-studs 20, and, as shown, three of the studs 20 are employed. The studs 20 are shouldered at their free end, so as to form that portion of the studs of less diameter than the remaining portion, as at 21. The function of the spacing-studs 20 will be hereinafter referred to.

Riveted or otherwise secured to the inner head-plate 18, preferably between a pair of the spacing-studs 20, is a bearing-spindle 22 for the multiplying-gear. Instead of securing the spindle 22 between a pair of the spacing-studs 20 the spindle may be arranged at any part of the head-plate 18 desired, so that the multiplying-gear will be retained in an operative position. The spindle 22 is formed of three sections—what may be termed the "forward," "intermediate," and "rear" sections. The forward section 23 is cylindrical in contour and somewhat elongated and is adapted to extend into the barrel of and form a bearing for the multiplying-gear to be hereinafter referred to. The intermediate section 24 is cylindrical in contour, but of greater diameter than the section 23, and forms a bearing against which the inner face of the multiplying-gear rests and is further adapted to retain the multiplying-gear a slight distance away from the head-plate 18, so that during the revolution of the multiplying-gear the same will not contact with the plate 18. The rear section 25 is cylindrical in contour, but is arranged in an eccentric manner with respect to the section 23. The rear section 24 is adapted to be riveted or otherwise secured in an opening formed in the inner head-plate 18. The function of constructing the rear section 25 of the bearing-spindle eccentric with respect to the forward section 23 is as follows: The usual method of securing the bearing-spindles into place is to screw them in. Consequently if the multiplying-gear is not in mesh with the pinion of the axis of the spool just the proper depth it is a very difficult matter to move the stud one way or the other to obtain a proper mesh, owing to the fact that if turned in one direction it would cause the bearing-spindle to be screwed from the plate, consequently carrying the multiplying-gear therewith, and if the spindle is screwed home in the first instance it is evident that a lack of threads will prevent a further screwing in of the spindle to bring the gear and spindle into proper mesh. Consequently it is a very difficult matter to move the stud to obtain the proper mesh of the gear and the pinion. By constructing the rear section of the spindle—that is, that part which is secured in the head-plate—in an eccentric manner with respect to the forward section of the spindle the depth of the mesh of the gear can be changed by rotating the stud in the opening of the head-plate. Therefore it is evident that by rotating the spindle in either direction the depth of the mesh between the gear and pinion can be either increased or diminished. Consequently it is a very easy matter to set the gear and pinion exactly the proper depth. After the proper depth is obtained the section 25 is then riveted or otherwise permanently secured in the head-plate 18.

The reference character 26 denotes the other or outer head-plate, which is provided with a plurality of openings 27 to receive that portion of the spacing-studs 20 of smaller diameter. The openings 27 are of such a diameter as to form a close or snug fit when that portion of smaller diameter of the spacing-studs 20 extends in the said openings 27. This arrangement will securely but detachably connect the outer head-plate 26 and the inner head-plate 18 together. The head-plate 26 is provided with a centrally-arranged opening through which extends the other of the projecting ends of the axis 12. The wall of said central opening in connection with a bearing-thimble 28, which registers with said opening, forms a bearing for the projecting end just referred to of the axis 12. The bearing-thimble 28 is secured in any suitable manner to the outer face of the plate 26. The latter is secured to the frame 1 by means of the internally-screw-threaded flanged collar 29, which engages the screw-threads 7 of the band 3. When the collar 29 is screwed home, the flange thereof is adapted to engage the outer face of the plate 26 and securely retain said plate in position at one end of the reel-frame 1. The outer head-plate 26 is also provided with an enlarged opening 30, registering with a bearing-sleeve 30′, through which extends the forward section 23 of the bearing-spindle 22, carrying the multiplying-gear to be hereinafter referred to. The head-plate 26 is also provided with an outwardly-extending lug 31, secured to its inner face and which is adapted to engage in the notch 10 of the band 3, and the lug 31 when seated in the notch 10 prevents the inner head-plate 18 and outer head-plate 26 from turning.

The reference character 32 denotes the multiplying-gear provided on its forward face with an elongated barrel 33, tapped in its outer end, as at 34. The handle (not shown) is adapted to be secured in the tapped end 34 of the barrel 33. The rear face of the multiplying-gear 32 is cut away, so that the intermediate section 24 of the bearing-spindle 22 can extend therein. By this arrangement the gear 32 can be brought close to the outer face of the inner head-plate 18; but the depth of the cut-away portion in the rear face of the multiplying-gear 32 is such that the intermediate section 24 of the bearing-spindle 22 will retain the multiplying-gear 32 out of contact at all times with the forward face of the inner head-plate 18.

It will be evident from the construction hereinbefore described, taken in connection with the accompanying drawings, that the reel can be readily taken apart and set up, and such operation is enabled to be accomplished by unscrewing the collars off of the bands 2 3, which will permit of the removal of the head-plates, and owing to the manner of connecting the inner head-plate and one of the outer head-plates together they can be readily separated and the multiplying-gear removed, and, furthermore, when the head-plates are removed from the frame 1 the spool can be readily withdrawn.

It is thought the many advantages of my new and improved fishing-reel can be readily understood from the foregoing description, taken in connection with the accompanying drawings, and it will furthermore be evident that changes, variations, and modifications can be resorted to without departing from the spirit of the invention or sacrificing any of its advantages, and I therefore do not wish to restrict myself to the details of construction hereinbefore described and as shown in the accompanying drawings, but reserve the right to make such changes, variations, and modifications as come properly within the scope of the protection prayed.

Having thus fully described my invention, what I claim as new, and desire to secure by Letters Patent, is—

1. In a fishing-reel, a tubular reel-frame, an inner and an outer head-plate therefor, and means carried by one of the head-plates and engaging in the other of the said plates for spacing the plates apart and for detachably connecting the plates together.

2. A fishing-reel comprising an inner head-plate, a bearing-spindle for a multiplying-gear carried by said plate, an outer head-plate through which extends said spindle, and a plurality of shouldered spacing-studs fixed to one of said plates and snugly engaging in the other of said plates for detachably connecting the plates together and for spacing the plates apart.

3. In a fishing-reel, a reel-frame comprising in its construction a pair of exteriorly-screw-threaded bands, one of said bands having its inner face provided with a shoulder near the outer edge thereof and the other of said bands having its inner face provided with a shoulder near the inner edge thereof.

4. In a fishing-reel, a frame, a head-plate secured to said frame at one end thereof, an inner head-plate arranged in said frame at the other end thereof, an outer head-plate, and means carried by the inner head-plate for detachably connecting the last-mentioned outer head-plate thereto.

5. A fishing-reel comprising an outer head-plate provided with a plurality of openings, an inner head-plate, a plurality of shouldered spacing-studs carried by said inner head-plate and adapted to engage in the openings of said outer head-plate for connecting said outer head-plate to said inner head-plate.

6. A fishing-reel comprising an outer and an inner head-plate, and means carried by one of the plates and snugly engaging in the other of the plates for detachably connecting the plates together.

7. A fishing-reel comprising an inner head-plate, a bearing-spindle for the multiplying-gear having an eccentric portion secured in said plate, an outer head-plate provided with an enlarged opening through which extends said spindle, and means fixedly secured to said inner head-plate and engaging in said outer head-plate for detachably connecting the said plates together.

8. A fishing-reel comprising a tubular frame provided with a pair of interiorly-arranged shoulders, a head-plate extending in one end of said frame and engaging one of said shoulders, means for removably securing the said plate to the said frame, an inner head-plate mounted in the other end of said frame and seated against the other of said shoulders, a bearing-spindle carried by said inner head-plate, an outer head-plate extending in one end of said frame and provided with an opening through which extends the said spindle, means carried by the inner head-plate and engaging in the outer head-plate through which extends the spindle for detachably connecting the said plates together, and means for removably securing the said pair of connected plates to the reel-frame.

9. A fishing-reel comprising an inner head-plate provided with a bearing-spindle for the multiplying-gear and further provided with a centrally-arranged opening adapted to permit of the extending therethrough of a projecting end of the axis of a spool, an outer head-plate provided with a centrally-arranged bearing means for the projecting end of the said axis, and means carried by the inner head-plate and engaging in the outer head-plate for detachably connecting the said plates together.

10. A fishing-reel comprising an inner head-plate provided with a bearing-spindle for the multiplying-gear and further provided with a centrally-arranged opening adapted to permit of the extending therethrough of a projecting end of the axis of a spool, an outer head-plate provided with a centrally-arranged bearing means for the projecting end of the said axis, and a plurality of shouldered spacing-studs carried by the inner head-plate and engaging in the outer head-plate for detachably connecting together and spacing the said plates apart.

11. A fishing-reel comprising a frame, a removable head-plate mounted in one end thereof, a removable head-plate mounted in the other end thereof, said inner head-plate provided with a centrally-arranged opening to permit of the extending therethrough of a projecting end of the axis of a spool, a bearing-spindle for the multiplying-gear provided with an eccentric portion secured in said inner head-plate, a removable outer head-plate provided with an opening through which extends the said spindle, and a plurality of spacing-studs carried by the inner head-plate and engaging the outer head-plate through which the spindle extends for detachably connecting the said plates together.

12. A fishing-reel comprising a frame, a head-plate secured within the frame at one end thereof and provided with a bearing, a head-plate secured to the other end thereof and provided with a bearing, a spool arranged within said frame and provided with an axis having projecting ends extending in the bearings of the head-plates, an inner head-plate arranged within said frame and provided with an opening through which extends one of the projecting ends of the axis of the spool, a bearing-spindle permanently secured to said inner head-plate and projecting through one of the head-plates, a multiplying-gear mounted upon said spindle and adapted to engage with the axis of the spool, a plurality of spacing-studs carried by the inner head-plate and engaging in the head-plate through which the spindle extends for detachably connecting the said plates together, and means for removably connecting the said plates to said frame.

13. A fishing-reel comprising an outer and an inner head-plate, one of which is provided with a plurality of openings, and a plurality of shouldered spacing-studs carried by the other of the plates and engaging in the openings for detachably connecting the plates together.

14. A fishing-reel comprising an inner head-plate, a bearing-spindle for the multiplying-gear carried by said plate, an outer plate through which extends said spindle, and a plurality of shouldered spacing-studs carried by one of the plates and engaging in the other of the plates for detachably connecting the plates together.

In testimony whereof I have hereunto set my hand in presence of two subscribing witnesses.

WILLIAM CARTER.

Witnesses:
C. A. HARRELL,
WILLIAM M. CONRAD.